(12) United States Patent
Cheng et al.

(10) Patent No.: US 10,230,948 B2
(45) Date of Patent: Mar. 12, 2019

(54) VIDEO TRANSMITTING SYSTEM WITH ON-THE-FLY ENCODING AND ON-THE-FLY DELIVERING AND ASSOCIATED VIDEO RECEIVING SYSTEM

(71) Applicant: MEDIATEK INC., Hsin-Chu (TW)

(72) Inventors: Chia-Yun Cheng, Hsinchu County (TW); Han-Liang Chou, Hsinchu County (TW); Yung-Chang Chang, New Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 116 days.

(21) Appl. No.: 15/422,425

(22) Filed: Feb. 1, 2017

(65) Prior Publication Data

US 2017/0223349 A1 Aug. 3, 2017

Related U.S. Application Data

(60) Provisional application No. 62/290,500, filed on Feb. 3, 2016.

(51) Int. Cl.
*H04N 19/10* (2014.01)
*H04N 19/15* (2014.01)
(Continued)

(52) U.S. Cl.
CPC ........... *H04N 19/10* (2014.11); *H04L 1/0018* (2013.01); *H04N 19/15* (2014.11); *H04N 19/423* (2014.11);
(Continued)

(58) Field of Classification Search
None
See application file for complete search history.

(56) References Cited

U.S. PATENT DOCUMENTS 9,819,950 B2 * 11/2017 Boles ............... H04N 19/42
10,003,811 B2 * 6/2018 Sadhwani ............ H04N 19/436
(Continued)

FOREIGN PATENT DOCUMENTS

JP    H09-200745 A    7/1997
JP    2001-346206 A   12/2001
(Continued)

OTHER PUBLICATIONS

Suehring et al., Ultra-low delay multi-layer decoding by interleaving of decoding units in SHVC and 3D/MV-HEVC, Joint Collaborative Team on Video Coding (JCT-VC) of ITU-T SG 16 WP 3 and ISO/IEC JTC 1/SC 29/WG 11, 13th Meeting, Apr. 18-26, 2013, pp. 1-6, JCTVC-M0204, Incheon, KR.
(Continued)

*Primary Examiner* — Jayanti K Patel
*Assistant Examiner* — Shadan E Haghani
(74) *Attorney, Agent, or Firm* — Winston Hsu

(57) ABSTRACT

A video transmitting system includes a source buffer, a video encoder, a bitstream buffer, and a transmitting circuit. The source buffer receives pixel data of pixels of a video frame. The video encoder retrieve pixel data of a portion of the pixels of the video frame from the source buffer, and starts encoding the pixel data of the portion of the pixels before pixel data of a last pixel of the video frame is received by the source buffer. The bitstream buffer receives a network abstraction layer (NAL) stream from the video encoder, wherein the NAL stream is generated by encoding the pixel data of the portion of the pixels. The transmitting circuit retrieves the NAL stream from the bitstream buffer, and starts outputting the NAL stream before the pixel data of the last pixel of the video frame is encoded by the video encoder.

9 Claims, 11 Drawing Sheets

(51) Int. Cl.
*H04L 1/00* (2006.01)
*H04N 19/423* (2014.01)
*H04N 19/436* (2014.01)
*H04N 19/182* (2014.01)

(52) U.S. Cl.
CPC ......... *H04N 19/436* (2014.11); *H04N 19/182* (2014.11)

(56) References Cited

U.S. PATENT DOCUMENTS

| | | | | |
|---|---|---|---|---|
| 2010/0262756 | A1* | 10/2010 | Rudelic | G11C 16/102 711/103 |
| 2013/0208079 | A1* | 8/2013 | Yassur | H04L 65/608 348/14.09 |
| 2014/0269913 | A1* | 9/2014 | Lee | H04N 19/197 375/240.12 |
| 2015/0016543 | A1* | 1/2015 | Rapaka | H04N 19/597 375/240.25 |
| 2016/0057441 | A1* | 2/2016 | Skupin | H04N 19/137 375/240.25 |
| 2016/0100196 | A1* | 4/2016 | Wu | H04N 19/70 375/240.02 |
| 2017/0105010 | A1* | 4/2017 | Wu | H04N 19/159 |
| 2017/0111412 | A1* | 4/2017 | Rogers | H04L 65/4069 |
| 2017/0142434 | A1* | 5/2017 | Gu | H04L 47/10 |

FOREIGN PATENT DOCUMENTS

| | | |
|---|---|---|
| JP | 2006-141037 A | 6/2006 |
| JP | 2009-177447 A | 8/2009 |
| JP | 2010-232720 A | 10/2010 |
| JP | 2011-216928 A | 10/2011 |
| JP | 2013-543311 A | 11/2013 |
| JP | 2014-520470 A | 8/2014 |
| JP | 2014-533466 A | 12/2014 |
| JP | 2015-507899 A | 3/2015 |
| WO | 2014/166964 A1 | 10/2014 |
| WO | 2015/007754 A1 | 1/2015 |

OTHER PUBLICATIONS

Skupin et al., Ultra-low delay with SHVC, MV-HEVC and 3D-HEVC, Joint Collaborative Team on Video Coding (JCT-VC) of ITU-T SG 16 WP 3 and ISO/IEC JTC 1/SC 29/WG 11, 14th Meeting, Jul. 25-Aug. 2, 2013, pp. 1-5, JCTVC-N0290, Vienna, AT.

Skupin et al., AHG20: Ultra Low Delay for SHVC, MV-HEVC and 3D-HEVC, Joint Collaborative Team on Video Coding (JCT-VC) of ITU-T SG 16 WP 3 and ISO/IEC JTC 1/SC 29/WG 11, 15th Meeting, Oct. 23-Nov. 1, 2013, pp. 1-5, JCTVC-00188, Geneva, CH.

* cited by examiner

VIDEO TRANSMITTING SYSTEM WITH ON-THE-FLY ENCODING AND ON-THE-FLY DELIVERING AND ASSOCIATED VIDEO RECEIVING SYSTEM

CROSS REFERENCE TO RELATED APPLICATIONS

This application claims the benefit of U.S. provisional application No. 62/290,500, filed on Feb. 3, 2016 and incorporated herein by reference.

BACKGROUND

The disclosed embodiments of the present invention relate to video data processing, and more particularly, to a video transmitting system with on-the-fly encoding and on-the-fly delivering and an associated video receiving system.

According to one conventional video processing design, a frame-based pipeline structure may be employed. Regarding a video transmitting system, the pipeline stages may include a video encoder and a transmitting circuit. However, the video encoder does not start encoding a video frame until pixel data of the video frame is fully received, and the transmitting circuit does not start outputting a video bitstream of an encoded video frame until encoded pixel data of a video frame is fully generated. Regarding a video receiving system, the pipeline stages may include a video decoder and a display circuit. However, the video decoder does not start decoding a video bitstream of an encoded video frame until encoded pixel data of a video frame is fully received, and the display circuit does not start driving a display device to show a video frame until decoded pixel data of the video frame is fully generated. The conventional frame-based pipeline structure may fail to meet the requirements of some ultra-low latency applications due to long latency between pipeline stages. Thus, there is a need for an innovative ultra-low latency video transmitting system design and an ultra-low latency video receiving system design.

SUMMARY

In accordance with exemplary embodiments of the present invention, a video transmitting system with on-the-fly encoding and on-the-fly delivering and an associated video receiving system are proposed to solve the above-mentioned problem.

According to a first aspect of the present invention, an exemplary video transmitting system is disclosed. The exemplary video transmitting system includes a source buffer, a video encoder, a bitstream buffer, and a transmitting circuit. The source buffer is arranged to receive pixel data of pixels of a video frame to be encoded. The video encoder is arranged to retrieve pixel data of a portion of the pixels of the video frame from the source buffer, and start encoding the pixel data of the portion of the pixels of the video frame before pixel data of a last pixel of the video frame is received by the source buffer. The bitstream buffer is arranged to receive a network abstraction layer (NAL) stream from the video encoder, wherein the NAL stream is generated by encoding the pixel data of the portion of the pixels of the video frame. The transmitting circuit is arranged to retrieve the NAL stream from the bitstream buffer, and start outputting the NAL stream before the pixel data of the last pixel of the video frame is encoded by the video encoder.

According to a second aspect of the present invention, an exemplary video receiving system is disclosed. The exemplary video receiving system includes a receiving circuit, a bitstream buffer, a video decoder, a display buffer, and a display circuit. The receiving circuit is arranged to receive NAL streams to be decoded, wherein the NAL streams are generated from encoding pixel data of pixels of a video frame. The bitstream buffer is arranged to receive the NAL streams from the receiving circuit. The video decoder is arranged to retrieve an NAL stream of the NAL streams from the bitstream buffer, and start decoding the NAL stream before a last NAL stream of the NAL streams is received by the bitstream buffer. The display buffer is arranged to receive decoded pixel data of the video frame from the video decoder. The display circuit is arranged to retrieve decoded pixel data of a portion of the pixels of the video frame from the display buffer, and drive a display device according to the decoded pixel data of the portion of the pixels of the video frame before a decoded pixel data of a last pixel of the video frame is generated from the video decoder, wherein the decoded pixel data of the portion of the pixels of the video frame is generated from decoding the NAL stream.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is electrically connected to another device, that connection may be through a direct electrical connection, or through an indirect electrical connection via other devices and connections.

Figure 1:
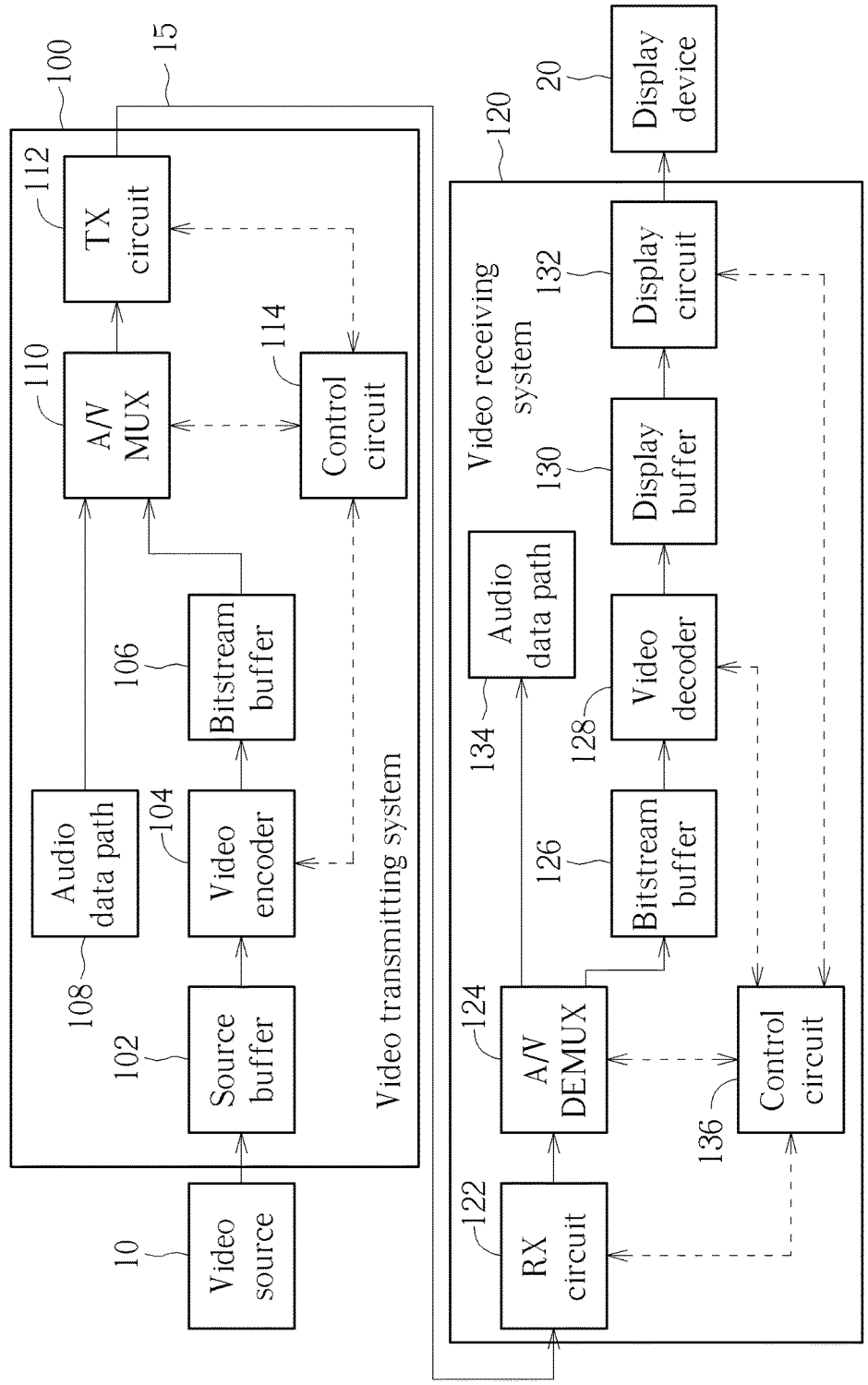
FIG. 1 is a block diagram illustrating a video transmitting system and a video receiving system according to an embodiment of the present invention.

FIG. 1 is a block diagram illustrating a video transmitting system and a video receiving system according to an embodiment of the present invention. Byway of example, but not imitation, the video transmitting system 100 and the video receiving system 120 may be employed by an ultra-low latency applications such as a virtual reality (VR) application. In this embodiment, the video transmitting system 100 includes a source buffer 102, a video encoder 104, a bitstream buffer 106, an audio data path 108, an audio/video multiplexing circuit (denoted by "A/V MUX") 110, a transmitting (TX) circuit 112, and a control circuit (e.g., a central processing unit) 114; and the video receiving system 120 includes a receiving (RX) circuit 112, an audio/video demultiplexing circuit (denoted by "A/V DEMUX") 124, a bitstream buffer 126, a video decoder 128, a display buffer 130, a display circuit 132, an audio data path 134, and a control circuit (e.g., a central processing unit) 136. The video transmitting system 100 may serve as a video recording system that is used to encode video frames provided from a video source 10 and generate encoded video frames to the video receiving system 120 via a communication link 15, and the video receiving system 120 may serve as a video playback system that is used to receive encode video frames from the communication link 15 and generate decoded video frames to a display device 20 for video playback. For example, the video source 10 may be a camera device, the display device 20 may be a display screen of a VR headset.

In addition, the video encoder 104 and the video decoder 128 can be implemented according to any video coding standard such as H.264, HEVC, VP9 or AVS2, and the communication link 15 may be implemented using a wired link or a wireless link.

Regarding each of the video transmitting system 100 and the video receiving system 120, a frame segment based pipeline structure (e.g., a slice based pipeline structure) may be employed to effectively reduce the latency between pipeline stages. For example, the video transmitting system 100 using a frame segment based pipeline structure may be configured to perform on-the-fly encoding and on-the-fly delivering, and the video receiving system 120 using a frame segment based pipeline structure may be configured to perform on-the-fly decoding and one-the-fly displaying. Further details of the proposed frame segment based pipeline structure (e.g., slice based pipeline structure) are described as below.

A video frame to be encoded is provided by the video source 10. The source buffer 102 may be a memory device arranged to receive pixel data of pixels of the video frame to be encoded. The video encoder 104 is arranged to retrieve pixel data of a portion of the pixels of the video frame from the source buffer 102, and start encoding the pixel data of the portion of the pixels of the video frame before pixel data of a last pixel of the video frame is received by the source buffer 102. The bitstream buffer 106 may be a memory device arranged to receive a network abstraction layer (NAL) stream from the video encoder 104. The NAL stream is a video bitstream generated by encoding the pixel data of the portion of the pixels of the video frame. For example, the NAL stream may include at least one NAL unit, each generated from encoding the portion of the pixels of the video frame (e.g., one coding block row of the video frame).

The A/V MUX 110 receives video bitstreams from the bitstream buffer 106 and audio bitstreams from the audio data path 108, and performs audio/video multiplexing upon the video bitstreams and the audio bitstreams to generate a single bitstream output to the TX circuit 112. Since the present invention focuses on the video processing and delivery, further description of the audio processing and delivery is omitted here for brevity. The TX circuit 112 is arranged to retrieve the NAL stream (which is generated by encoding the pixel data of the portion of the pixels of the video frame) from the bitstream buffer 106 via the A/V MUX 110, and start outputting the NAL stream before the pixel data of the last pixel of the video frame is encoded by the video encoder 104.

Figure 2:
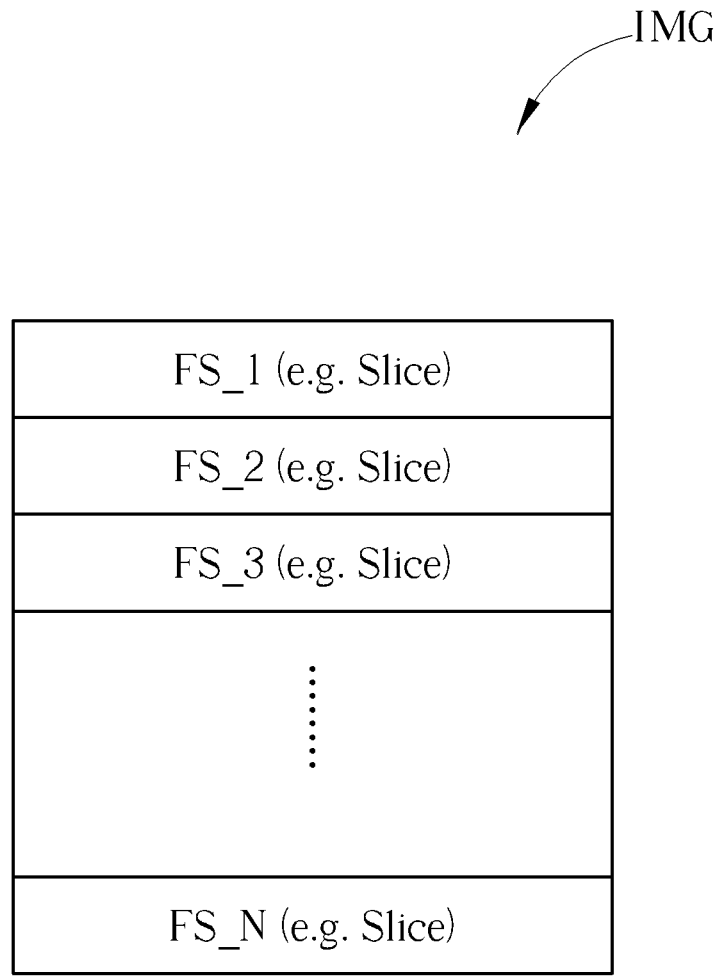
FIG. 2 is a diagram illustrating an exemplary frame partitioning design according to an embodiment of the present invention.

In this embodiment, a video frame is partitioned into a plurality of frame segments, such that each of the frame segments includes a portion of pixels of the video frame. One frame segment may include one or more coding block rows, depending upon the actual design considerations. FIG. 2 is a diagram illustrating an exemplary frame partitioning design according to an embodiment of the present invention. As shown in FIG. 2, one video frame IMG includes N frame segments FS_1, FS_2, FS_3 . . . FS_N, and each of the frame segments FS_1-FS_N includes at least one coding block row, where N is a positive integer equal to or larger than two (i.e., N≥2). Taking High Efficiency Video Coding (HEVC) for example, the frame segments FS_1-FS_N may be slices, each having one largest coding unit (LCU) row. Since the video frame IMG is partitioned into frame segments (e.g., slices) FS_1-FS_N, a frame segment based pipeline structure (e.g., a slice based pipeline structure) may be employed by each of the video transmitting system 100 and the video receiving system 120 to meet the ultra-low latency requirement.

Figure 3:
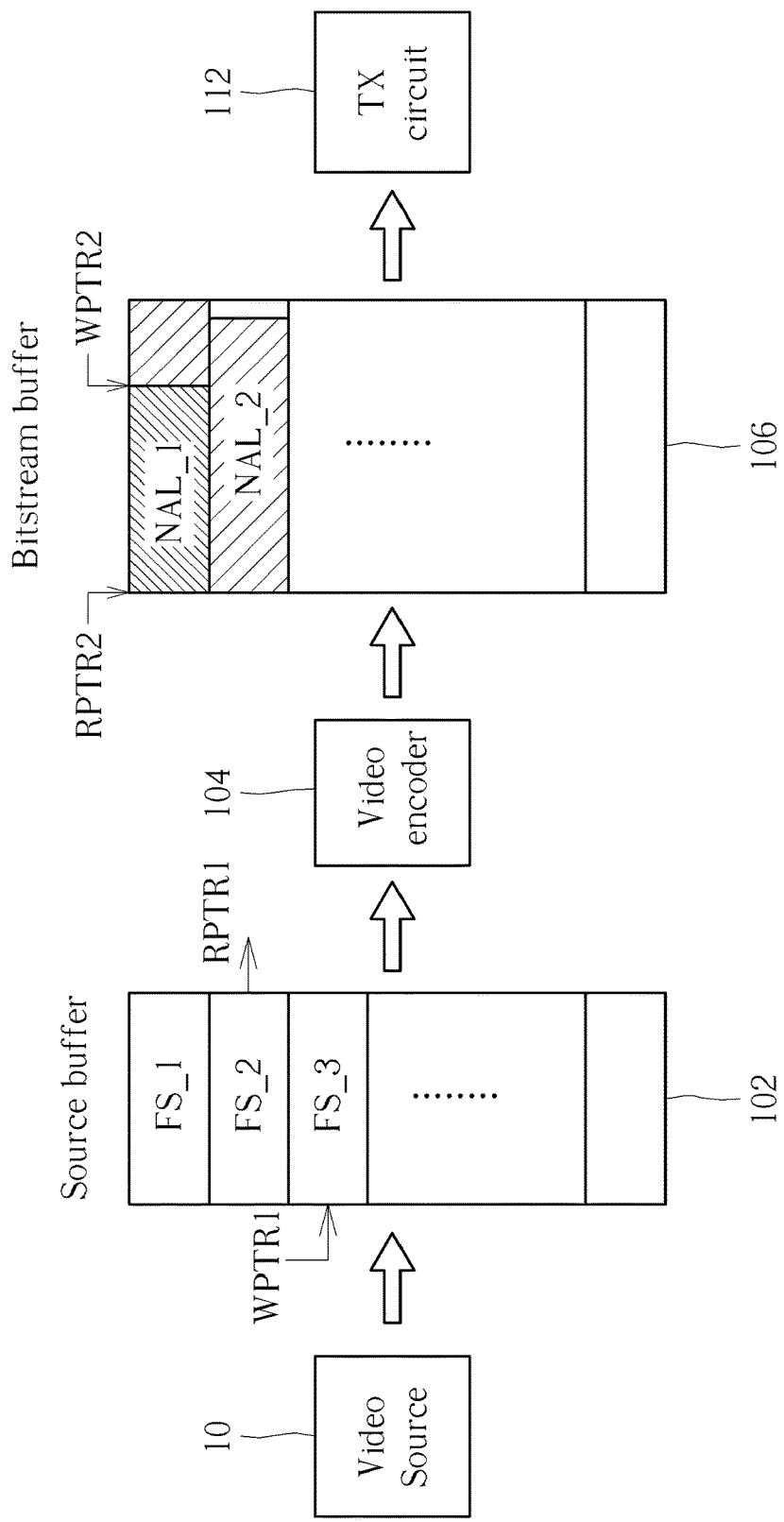
FIG. 3 is a diagram illustrating a frame segment based pipeline employed by the video transmitting system according to an embodiment of the present invention.

FIG. 3 is a diagram illustrating a frame segment based pipeline employed by the video transmitting system 100 according to an embodiment of the present invention. Consider a case where a single-frame-segment pipeline is employed. Hence, when a specific frame segment is available in the source buffer 102, the video encoder 104 is allowed to start encoding the specific frame segment; and when a specific NAL stream (which is generated by encoding the specific frame segment) is available in the bitstream buffer 106, the TX circuit 112 is allowed to start outputting the specific NAL stream. Consider another case where a multi-frame-segment pipeline is employed. Hence, when a specific group of successive frame segments is available in the source buffer 102, the video encoder 104 is allowed to start encoding the specific group of successive frame segments; and when a specific group of successive NAL streams (which is generated by encoding the specific group of successive frame segments) is available in the bitstream buffer 106, the TX circuit 112 is allowed to start outputting the specific group of successive NAL streams.

The example shown in FIG. 3 employs a single-frame-segment pipeline for illustrative purposes. Regarding the source buffer 102, a write pointer WPTR1 controls a write address where incoming pixel data is stored into the source buffer 102, and a read pointer RPTR1 controls a read address where stored pixel data is read from the source buffer 102. Regarding the bitstream buffer 106, a write pointer WPTR2 controls a write address where incoming NAL data is stored into the bitstream buffer 106, and a read pointer RPTR2 controls a read address where stored NAL data is read from the bitstream buffer 106. The video source 10 writes frame segments FS_1 and FS_2 into the source buffer 102 sequentially, the video encoder 104 encodes the frame segments FS_1 and FS_2 sequentially read from the source buffer 102 to generate corresponding NAL streams NAL_1 and NAL_2, and the TX circuit 112 outputs the NAL streams NAL_1 and NA_L 2 sequentially read from the bitstream buffer 106. When the video source 10 starts writing pixel data of pixels included in the frame segment FS_3 according to a write address pointed to by the write pointer WPTR1, pixel data of pixels included in the frame segment FS_1 and pixel data of pixels included in the frame segment FS_2 are already stored in the source buffer 102. Hence, after the video encoder 104 finishes encoding the frame segment FS_1 to generate a corresponding NAL stream NAL_1, the video encoder 104 retrieves pixel data of pixels included in the frame segment FS_2 from the source buffer 102 according to a read address pointed to by the read pointer RPTR1, and starts encoding the frame segment FS_2 to generate a corresponding NAL stream NAL_2 to the bitstream buffer 106 according to a write address pointed to by the write pointer WPTR2. When the video encoder 104 starts writing the NAL stream. NAL_2 (which is generated from encoding the frame segment FS_2) into the bitstream buffer 106, an NAL stream NAL_1 generated from encoding the frame segment FS_1 is already available in the bitstream buffer 106. Hence, after the video encoder 104 finishes encoding the frame segment FS_1 to generate the NAL stream NAL_1, the TX circuit 112 retrieves the NAL stream NAL_1 from the bitstream buffer 106 according to a read address pointed by the read pointer RPTR2, and starts outputting the NAL stream NAL_1 to the video receiving system 120 via the communication link 15. In this way, on-the-fly encoding and on-the-fly delivering of the video transmitting system 100 can be achieved by the proposed frame segment based pipeline structure. It should be noted that, to avoid stream data underflow or overflow, the video encoder 104 may be further arranged to monitor the bitstream buffer fullness/empty status according to the read pointer RPTR2 and the write pointer WPTR2.

The TX circuit 112 of the video transmitting system 100 transmits encoded video bitstreams and encoded audio bitstreams to the RX circuit 122 of the video receiving system 120 via the communication link 15. The A/V DEMUX 120 receives encoded video bitstreams (which are NAL streams generated by the video encoder 104) and encoded audio bitstreams (which are generated by the audio data path 108), and performs audio/video demultiplexing upon the encoded video bitstreams and the encoded audio bitstreams to separate the encoded video bitstreams and the encoded audio bitstreams, such that the encoded video bitstreams and the encoded audio bitstreams are forwarded to the bitstream buffer 126 and the audio data path 134, respectively. Since the present invention focuses on the video processing and playback, further description of the audio processing and playback is omitted here for brevity. Regarding the video processing and playback, the RX circuit 122 receives NAL streams to be decoded, and the bitstream buffer 126 receives the NAL streams from the RX circuit 122 through the A/V DEMUX 124.

The video decoder 128 is arranged to retrieve an NAL stream of NAL streams (which are generated by encoding pixel data of pixels of a video frame) from the bitstream buffer 126, and start decoding the NAL stream before a last NAL stream of the NAL streams is received by the bitstream buffer 126. The display buffer 130 is arranged to receive decoded pixel data of the video frame from the video decoder 128. The display circuit 132 is arranged to retrieve decoded pixel data of a portion of the pixels of the video frame from the display buffer 130, and drive the display device 20 according to the decoded pixel data of the portion of the pixels of the video frame before a decoded pixel data of a last pixel of the video frame is generated from the video decoder 128, wherein the decoded pixel data of the portion of the pixels of the video frame is generated from decoding the NAL stream read from the bitstream buffer 126.

As shown in FIG. 2, one video frame IMG is partitioned into multiple frame segments (e.g., slices) FS_1-FS_N, each including at least one coding block row (e.g., one LCU row). Since the video frame IMG is partitioned into frame segments (e.g., slices) FS_1-FS_N, a frame segment based pipeline structure (e.g., a slice based pipeline structure) may be employed by the video receiving system 120 to meet the ultra-low latency requirement.

Figure 4:
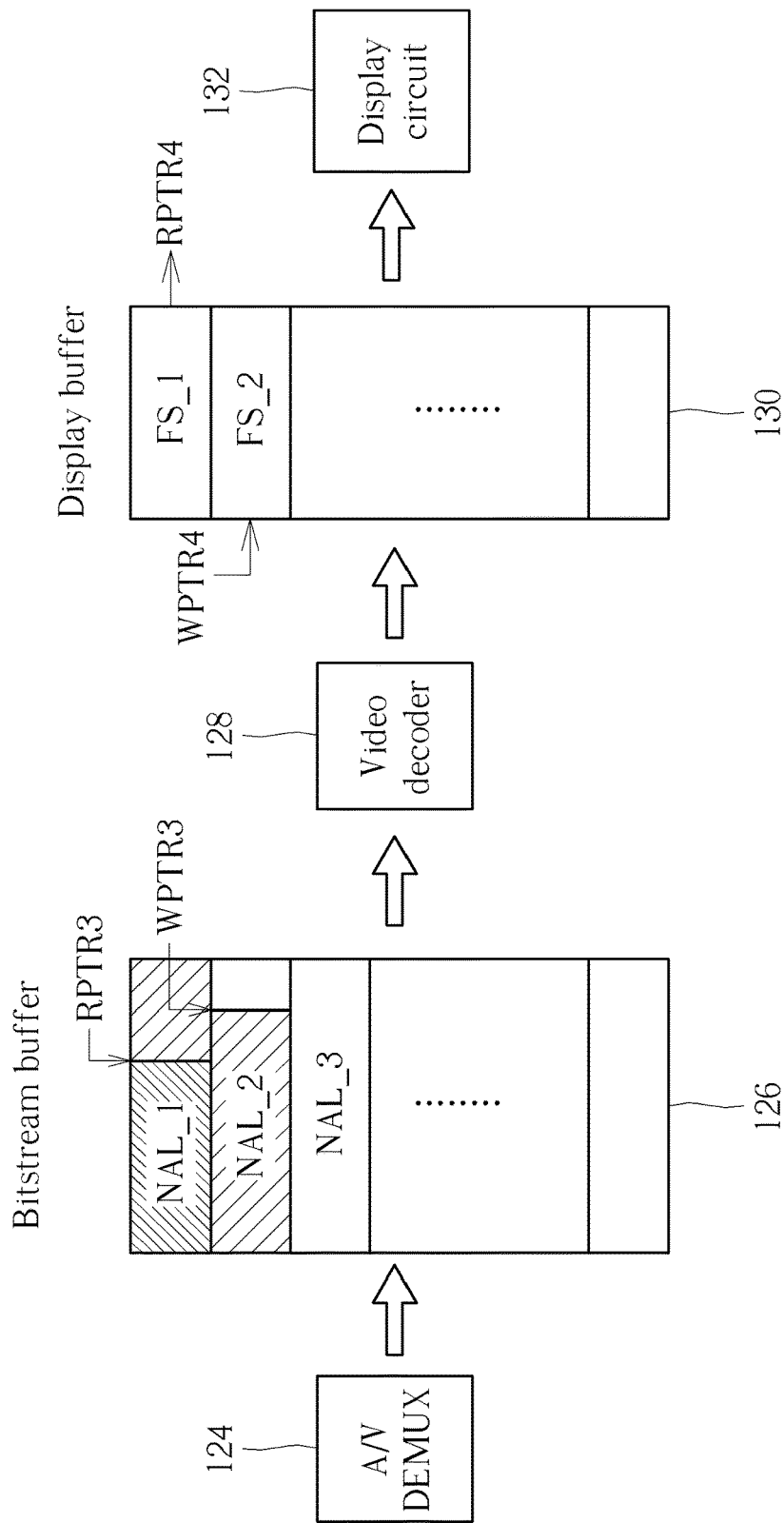
FIG. 4 is a diagram illustrating a frame segment based pipeline employed by the video receiving system according to an embodiment of the present invention.

FIG. 4 is a diagram illustrating a frame segment based pipeline employed by the video receiving system 120 according to an embodiment of the present invention. Consider a case where a single-frame-segment pipeline is employed. Hence, when a specific NAL stream is available in the bitstream buffer 126, the video decoder 128 is allowed to start decoding the specific NAL stream; and when decoded pixel data of a specific frame segment (which is generated by decoding the specific NAL stream) is available in the display buffer 130, the display circuit 132 is allowed to start driving the display device 20 to show the specific frame segment. Consider another case where a multi-frame-segment pipeline is employed. Hence, when a specific group of successive NAL streams is available in the bitstream buffer 126, the video decoder 128 is allowed to start decoding the specific group of successive NAL streams; and when decoded pixel data of a specific group of successive frame segments (which is generated by decoding the specific group of successive NAL streams) are available in the display buffer 130, the display circuit 132 is allowed to start driving the display device 20 to show the specific group of successive frame segments.

The example shown in FIG. 4 employs a single-frame-segment pipeline for illustrative purposes. Regarding the bitstream buffer 126, a write pointer WPTR3 controls a write address where incoming NAL data is stored into the bitstream buffer 126, and a read pointer RPTR3 controls a read address where stored NAL data is read from the bitstream buffer 126. Regarding the display buffer 130, a write pointer WPTR4 controls a write address where incoming decoded pixel data is stored into the display buffer 130, and a read pointer RPTR4 controls a read address where stored decoded pixel data is read from the display buffer 130. The A/V DEMUX 124 writes NAL streams NAL_1 and NAL_2 into the bitstream buffer 126 sequentially, the video decoder 128 decodes the NAL streams sequentially read from the bitstream buffer 126 to generate corresponding decoded frame segments FS_1 and FS_2, and the display circuit 132 drives the display device 20 according to the decoded frame segments FS_1 and FS_2 sequentially read from the display buffer 130. When the A/V DEMUX 124 starts writing an NAL stream NAL_3 into the bitstream buffer 126 according to a write address pointed to by the write pointer WPTR3, the NAL streams NAL_1 and NAL_2 are already stored in the bitstream buffer 126. Hence, after the video decoder 128 finishes decoding the NAL stream NAL_1 to generate decoded pixel data of the frame segment FS_1, the video decoder 104 retrieves the NAL stream NAL_2 from the bitstream buffer 126 according to a read address pointed to by the read pointer RPTR3, and starts decoding the NAL stream NAL_2 to generate decoded pixel data of a corresponding frame segment FS_2 to the display buffer 130 according to a write address pointed to by the write pointer WPTR4. When the video decoder 128 starts writing the decoded pixel data of the frame segment FS_1 (which is generated from decoding the NAL stream NAL_2) into the display buffer 130, decoded pixel data of the frame segment FS_1 generated from decoding the NAL stream NAL_1 is already available in the display buffer 130. Hence, after the video decoder 128 finishes decoding the NAL stream. NAL_1 to generate decoded pixel data of the frame segment FS_1, the display circuit 132 retrieves the decoded pixel data of the frame segment FS_1 from the display buffer 130 according to a read address pointed by the read pointer RPTR4, and starts driving the display device 20 to show the frame segment FS_1. In this way, on-the-fly decoding and on-the-fly display driving of the video receiving system 120 can be achieved by the proposed frame segment based pipeline structure. It should be noted that, to avoid display data underflow or overflow, the video decoder 128 may be further arranged to monitor the display buffer fullness/empty status according to the read pointer RPTR4 and the write pointer WPTR4.

In a conventional design, an end of a current video frame is known at the time a start of a next video frame is detected. A conventional video playback system suffers from the video playback latency resulting from latency between transmission of the end of the current video frame and transmission of the start of the next video frame. To achieve ultra-low latency video playback, the present invention further proposes transmitting an "end of video frame" message from a video transmitting system (which may serve as a video recording system) to a video receiving system (which may serve as a video playback system), where the proposed "end of video frame" message can notify the video receiving system that encoded pixel data of a video frame has been completely transmitted by the video transmitting system, and can also be useful to certain operations such as error handling judgment.

Figure 5:
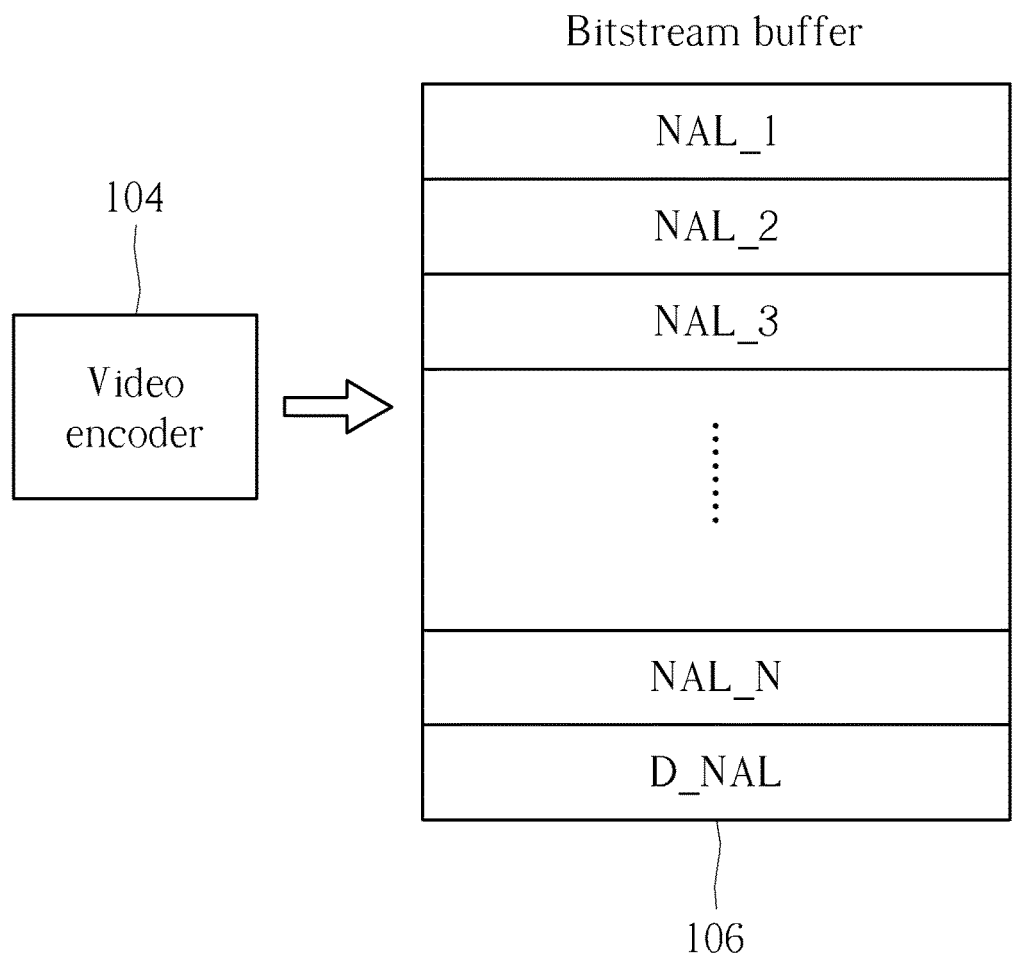
FIG. 5 is a diagram illustrating a dummy NAL stream generated by a video encoder according to an embodiment of the present invention.

In one exemplary design, the "end of video frame" message is transmitted by using a dummy NAL stream. FIG. 5 is a diagram illustrating a dummy NAL stream generated by a video encoder according to an embodiment of the present invention. Suppose that the exemplary frame partitioning design shown in FIG. 2 is applied to each video frame. Hence, one video frame IMG is partitioned into frame segments (e.g., slices) FS_1-FS_N, each having at least one coding block row (e.g., one LCU row). The video encoder 104 encodes the frame segments FS_1-FS_N sequentially. Hence, the video encoder 104 generates NAL streams NAL_1-NAL_N to the bitstream buffer 106 sequentially, where the NAL stream NAL_N is the last NAL stream generated from the encoding of the video frame IMG. In this embodiment, the video encoder 104 is further arranged to append a dummy NAL stream D_NAL to the last NAL stream NAL_N, where the dummy NAL unit D_NAL has a user-defined NAL type, and is set to indicate an end of the video frame IMG.

Since the TX circuit 112 of the video transmitting system 100 outputs the NAL streams NAL_1-NAL_N and the dummy NAL stream D_NAL sequentially, the RX circuit 122 of the video receiving system 120 receives the NAL streams NAL_1-NAL_N and the dummy NAL stream D_NAL sequentially. The video receiving system 120 can refer to the detected dummy NAL stream D_NAL to know that encoded pixel data of the video frame IMG has been completely transmitted by the video transmitting system 100. Since an end of transmission of encoded pixel data of a current video frame can be known by the video receiving system 120 before the video receiving system 120 starts receiving encoded pixel data of a next video frame, the video playback latency of the current video frame can be effectively reduced.

Figure 6:
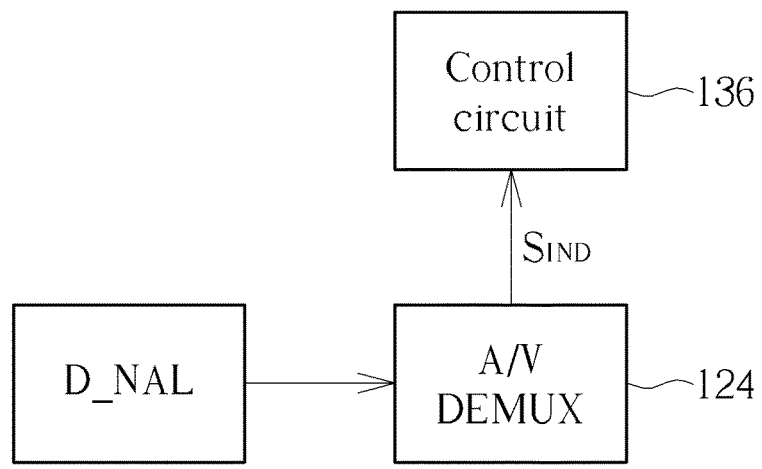
FIG. 6 is a diagram illustrating a first arrangement used for processing the dummy NAL stream received by the video receiving system according to an embodiment of the present invention.

FIG. 6 is a diagram illustrating a first arrangement used for processing the dummy NAL stream D_NAL received by the video receiving system 120 according to an embodiment of the present invention. The A/V DEMUX 124 is further arranged to detect existence of the dummy NAL stream D_NAL. When the dummy NAL stream D_NAL is detected by the A/V DEMUX 124, the A/V DEMUX 124 is further arranged to generate an indicator $S_{IND}$ to the control circuit (e.g., CPU) 136 to inform the control circuit 136 of the end of the video frame IMG, such that the control circuit 136 can take predetermined action in response to the indicator $S_{IND}$.

Figure 7:
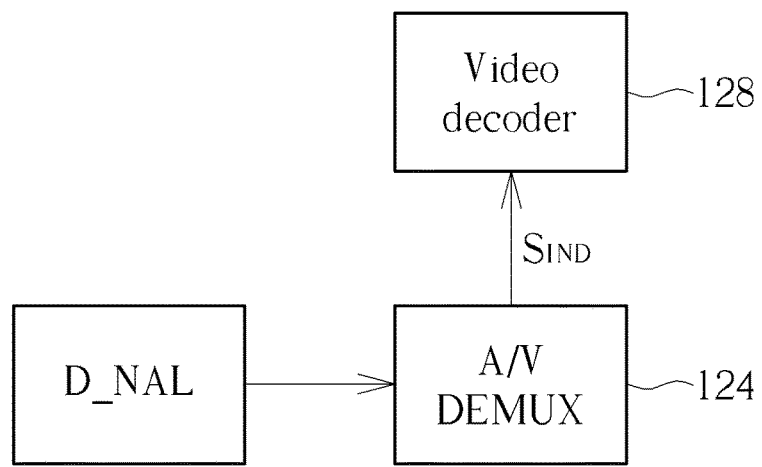
FIG. 7 is a diagram illustrating a second arrangement used for processing the dummy NAL stream received by the video receiving system according to an embodiment of the present invention.

FIG. 7 is a diagram illustrating a second arrangement used for processing the dummy NAL stream D_NAL received by the video receiving system 120 according to an embodiment of the present invention. The A/V DEMUX 124 is further arranged to detect existence of the dummy NAL stream D_NAL. When the dummy NAL stream D_NAL is detected by the A/V DEMUX 124, the A/V DEMUX 124 is further arranged to generate an indicator $S_{IND}$ to the video decoder 128 to inform the video decoder 128 of the end of the video frame IMG, such that the video decoder 128 can take predetermined action in response to the indicator $S_{IND}$.

Figure 8:
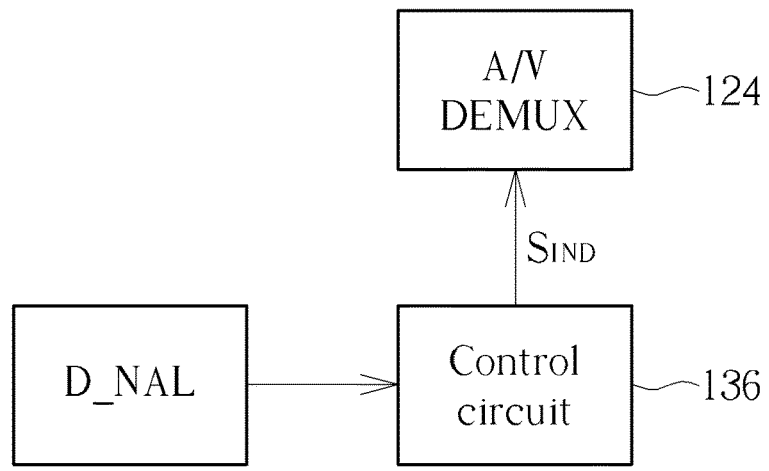
FIG. 8 is a diagram illustrating a third arrangement used for processing the dummy NAL stream received by the video receiving system according to an embodiment of the present invention.

FIG. 8 is a diagram illustrating a third arrangement used for processing the dummy NAL stream D_NAL received by the video receiving system 120 according to an embodiment of the present invention. The control circuit (e.g., CPU) 136 is further arranged to detect existence of the dummy NAL stream D_NAL. When the dummy NAL stream D_NAL is detected by the control circuit 136, the control circuit 136 is further arranged to generate an indicator $S_{IND}$ to the A/V DEMUX 124 to inform the A/V DEMUX 124 of the end of the video frame IMG, such that the A/V DEMUX 124 can take predetermined action in response to the indicator $S_{IND}$.

Figure 9:
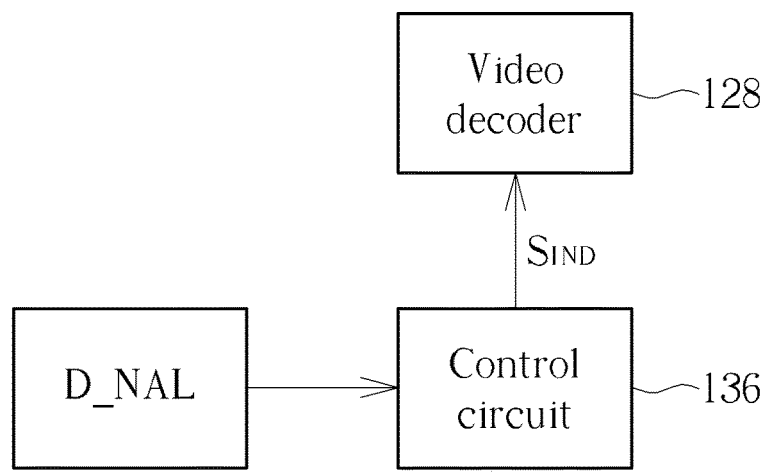
FIG. 9 is a diagram illustrating a fourth arrangement used for processing the dummy NAL stream received by the video receiving system according to an embodiment of the present invention.

FIG. 9 is a diagram illustrating a fourth arrangement used for processing the dummy NAL stream D_NAL received by the video receiving system 120 according to an embodiment of the present invention. The control circuit (e.g., CPU) 136 is further arranged to detect existence of the dummy NAL stream D_NAL. When the dummy NAL stream D_NAL is detected by the control circuit 136, the control circuit 136 is further arranged to generate an indicator $S_{IND}$ to the video decoder 128 to inform the video decoder 128 of the end of the video frame IMG, such that the video decoder 128 can take predetermined action in response to the indicator $S_{IND}$.

Figure 10:
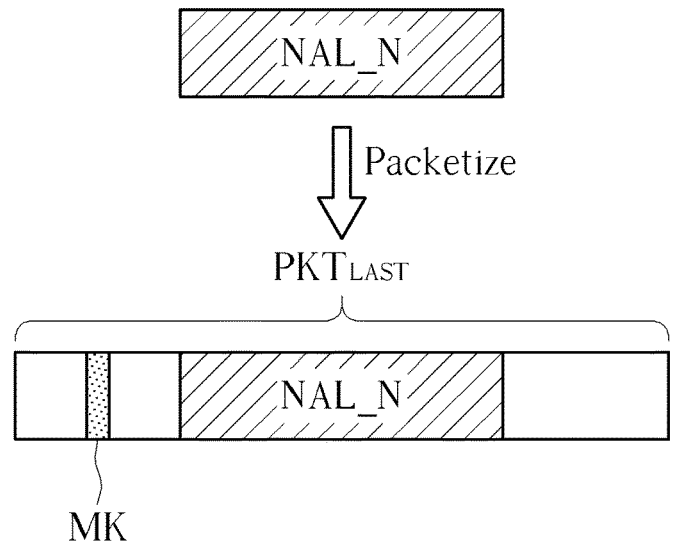
FIG. 10 is a diagram illustrating a first arrangement of a special marker included in a packet generated from a transmitting circuit according to an embodiment of the present invention.

In another exemplary design, the "end of video frame" message is transmitted by using a special marker recorded in a packet. FIG. 10 is a diagram illustrating a first arrangement of a special marker included in a packet generated from a transmitting circuit according to an embodiment of the present invention. Suppose that the exemplary frame partitioning design shown in FIG. 2 is applied to each video frame. Hence, one video frame IMG is partitioned into frame segments (e.g., slices) FS_1-FS_N, each having at least one coding block row (e.g., one LCU row). The video encoder 104 encodes the frame segments FS_1-FS_N sequentially. Hence, the video encoder 104 generates NAL streams NAL_1-NAL_N sequentially, where the NAL stream NAL_N is the last NAL stream generated from the encoding of the video frame IMG. In some embodiments of the present invention, the communication link 15 may be a network link such as a WiFi link. Hence, the TX circuit 112 is a part of a network interface, and is used to transmit the NAL streams NAL_1-NAL_N by packets. For example, the TX circuit 112 packetizes the NAL streams NAL_1-NAL_N into packets, and outputs the packets to the video receiving system 120 via the communication link 15. In this example, the last NAL stream NAL_N is fully transmitted by the payload of a last packet $PKT_{LAST}$ of the packets that are used for transmitting the NAL streams NAL_1-NAL_N. The TX circuit 112 is further arranged to insert a special marker MK in the last packet $PKT_{LAST}$, where the special marker MK is set by using at least one reserved bit of the last packet $PKT_{LAST}$ to indicate an end of the video frame IMG. In this example, the special marker MK is recorded in reserve bit (s) located before the last NAL stream NAL_N in the last packet $PKT_{LAST}$. However, this is for illustrative purposes only, and is not meant to be a limitation of the present invention. Alternatively, the special marker MK may be recorded in reserve bit (s) located after the last NAL stream NAL_N in the last packet $PKT_{LAST}$. This also falls within the scope of the present invention.

Figure 11:
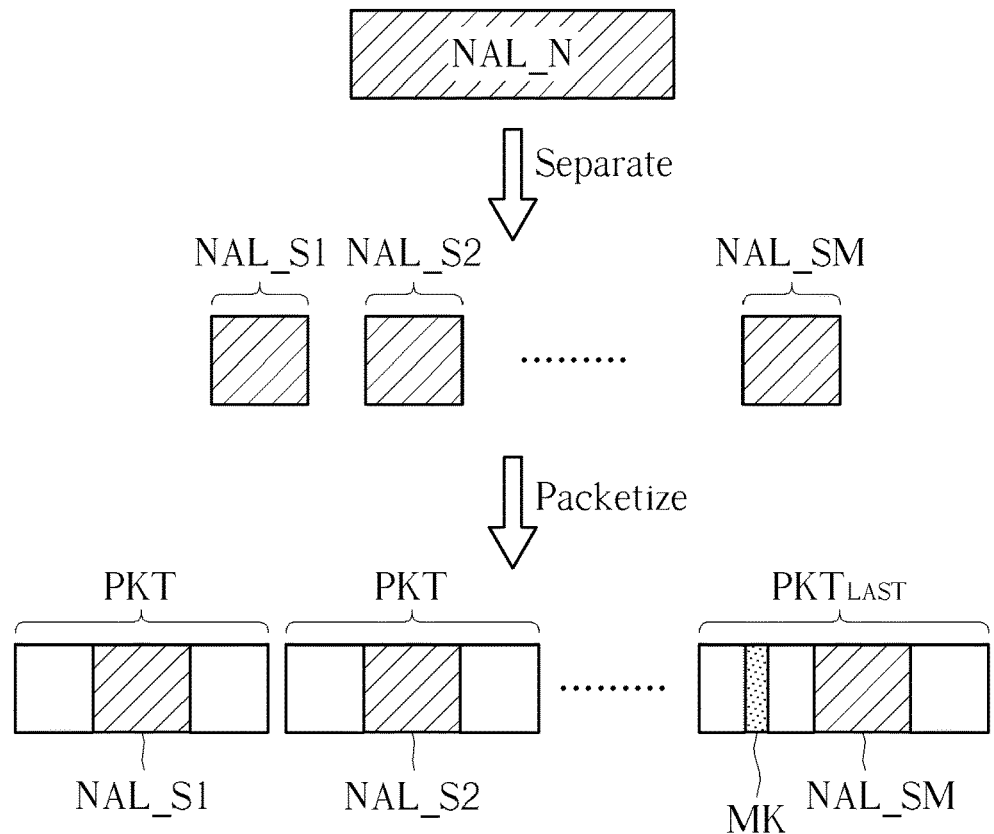
FIG. 11 is a diagram illustrating a second arrangement of a special marker included in a packet generated from a transmitting circuit according to another embodiment of the present invention.

FIG. 11 is a diagram illustrating a second arrangement of a special marker included in a packet generated from a transmitting circuit according to another embodiment of the present invention. Suppose that the exemplary frame partitioning design shown in FIG. 2 is applied to each video frame. Hence, one video frame IMG is partitioned into frame segments (e.g., slices) FS_1-FS_N, each having at least one coding block row (e.g., one LCU row). The video encoder 104 encodes the frame segments FS_1-FS_N sequentially. Hence, the video encoder 104 generates NAL streams NAL_1-NAL_N sequentially, where the NAL stream NAL_N is the last NAL stream generated from the encoding of the video frame IMG. In some embodiments of the present invention, the communication link 15 may be a network link such as a WiFi link. Hence, the TX circuit 112 is a part of a network interface, and is used to transmit the NAL streams NAL_1-NAL_N by packets. For example, the TX circuit 112 packetizes the NAL streams NAL_1-NAL_N into packets, and outputs the packets to the video receiving system 120 via the communication link 15. In this example, the last NAL stream NAL_N is separated into multiple NAL segments NAL_S1, NAL_S2 . . . NAL_SM, where M is a positive integer equal to or larger than 2 (i.e., M ≥2). The NAL segments NAL_S1-NAL_SM are transmitted by the payload of multiple packets, respectively. As shown in FIG. 11, the last NAL segment NAL_SM is fully transmitted by the payload of a last packet $PKT_{LAST}$ of the packets that are used for transmitting the last NAL stream NAL_N. In other words, the packet $PKT_{LAST}$ is also the last packet of packets that are used for transmitting the NAL streams NAL_1-NAL_N generated from encoding frame segments FS_1-FS_N of the video frame IMG. The TX circuit 112 is further arranged to insert a special marker MK in the last packet $PKT_{LAST}$, where the special marker MK is set by using at least one reserved bit of the last packet $PKT_{LAST}$ to indicate an end of the video frame IMG. In this example, the special marker MK is recorded in reserve bit (s) located before the last NAL stream NAL_N in the last packet $PKT_{LAST}$. However, this is for illustrative purposes only, and is not meant to be a limitation of the present invention. Alternatively, the special marker MK may be recorded in reserve bit (s) located after the last NAL stream NAL_N in the last packet $PKT_{LAST}$. This also falls within the scope of the present invention.

Since the TX circuit 112 of the video transmitting system 100 outputs packets (which are generated from packetizing the NAL streams NAL_1-NAL_N) sequentially, the RX circuit 122 of the video receiving system 120 receives the packets (which carry the NAL streams NAL_1-NAL_N) sequentially. The video receiving system 120 can refer to the special marker MK to know encoded pixel data of the video frame IMG has been completely transmitted by the video transmitting system 100. Since an end of transmission of encoded pixel data of a current video frame can be known by the video receiving system 120 before the video receiving system 120 starts receiving encoded pixel data of a next video frame, the video playback latency of the current video frame can be effectively reduced.

Figure 12:
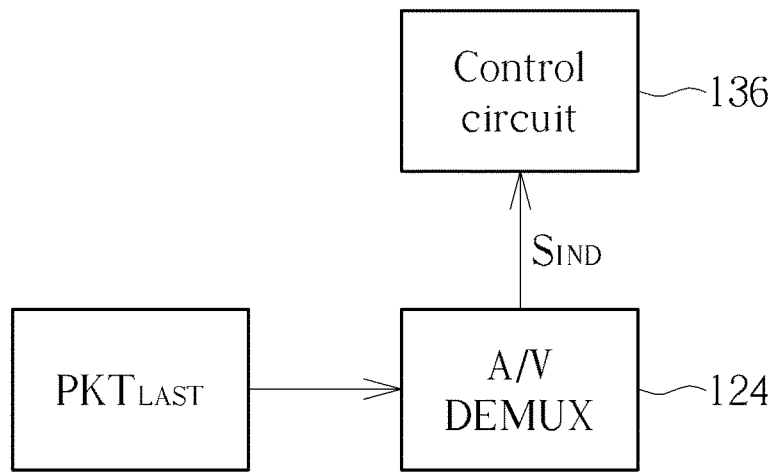
FIG. 12 is a diagram illustrating a first arrangement used for processing the special marker received by the video receiving system according to an embodiment of the present invention.

FIG. 12 is a diagram illustrating a first arrangement used for processing the special marker MK received by the video receiving system 120 according to an embodiment of the present invention. The A/V DEMUX 124 is further arranged to detect existence of the special marker MK. When the special marker MK is detected by the A/V DEMUX 124, the A/V DEMUX 124 is further arranged to generate an indicator $S_{IND}$ to the control circuit (e.g., CPU) 136 to inform the control circuit 136 of the end of the video frame IMG, such that the control circuit 136 can take predetermined action in response to the indicator $S_{IND}$.

Figure 13:
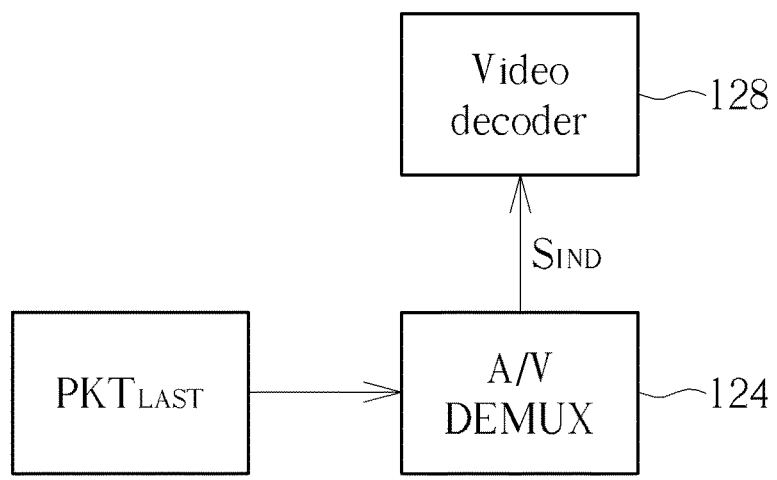
FIG. 13 is a diagram illustrating a second arrangement used for processing the special marker received by the video receiving system according to an embodiment of the present invention.

FIG. 13 is a diagram illustrating a second arrangement used for processing the special marker MK received by the video receiving system 120 according to an embodiment of the present invention. The A/V DEMUX 124 is further arranged to detect existence of the special marker MK. When the special marker MK is detected by the A/V DEMUX 124, the A/V DEMUX 124 is further arranged to generate an indicator $S_{IND}$ to the video decoder 128 to inform the video decoder 128 of the end of the video frame IMG, such that the video decoder 128 can take predetermined action in response to the indicator $S_{IND}$.

Figure 14:
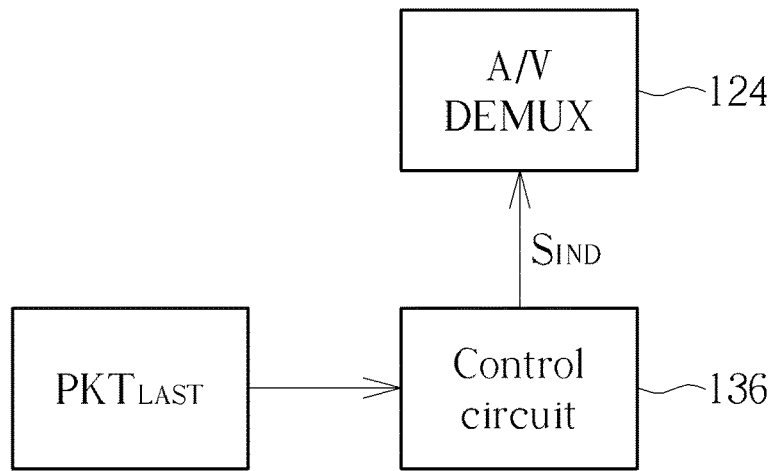
FIG. 14 is a diagram illustrating a third arrangement used for processing the special marker received by the video receiving system according to an embodiment of the present invention.

FIG. 14 is a diagram illustrating a third arrangement used for processing the special marker MK received by the video receiving system 120 according to an embodiment of the present invention. The control circuit (e.g., CPU) 136 is further arranged to detect existence of the special marker MK. When the special marker MK is detected by the control circuit 136, the control circuit 136 is further arranged to generate an indicator $S_{IND}$ to the A/V DEMUX 124 to inform the A/V DEMUX 124 of the end of the video frame IMG, such that the A/V DEMUX 124 can take predetermined action in response to the indicator $S_{IND}$.

Figure 15:
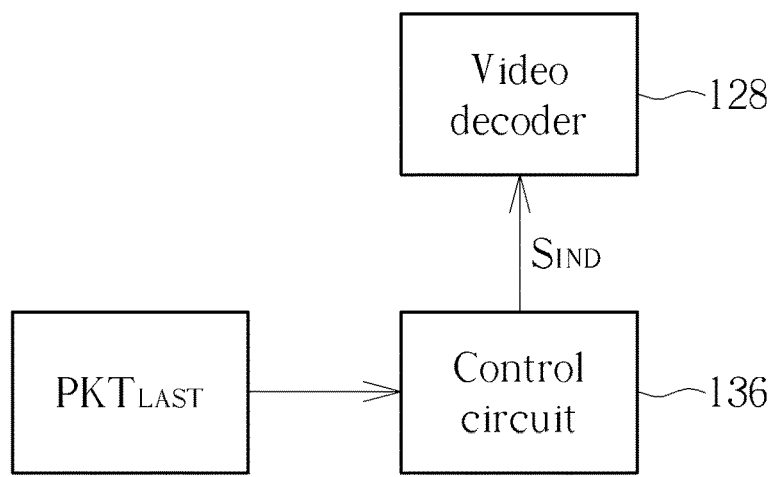
FIG. 15 is a diagram illustrating a fourth arrangement used for processing the special marker received by the video receiving system according to an embodiment of the present invention.

FIG. 15 is a diagram illustrating a fourth arrangement used for processing the special marker MK received by the video receiving system 120 according to an embodiment of the present invention. The control circuit (e.g., CPU) 136 is further arranged to detect existence of the special marker MK. When the special marker MK is detected by the control circuit 136, the control circuit 136 is further arranged to generate an indicator $S_{IND}$ to the video decoder 128 to inform the video decoder 128 of the end of the video frame IMG, such that the video decoder 128 can take predetermined action in response to the indicator $S_{IND}$.

The video encoder latency may be affected by several factors, such as the video resolution (particularly, the vertical size), the coding block size (e.g., LCU size), and the frame segment size (e.g., slice size). It should be noted that the number of frame segments included in one video frame depends on the frame segment size. Hence, changing the frame segment size is equivalent to changing the number of frame segments included in one video frame. When the input time for feeding one full video frame into the video encoder is fixed, the larger video resolution (larger vertical size) implies shorter latency for receiving pixel data of one frame segment to be encoded by the video encoder. When the frame encoding rate of the video encoder is fixed, the larger video resolution (larger vertical size) implies longer latency for encoding pixel data of one frame segment. In addition, the larger coding block size (e.g., LCU size) implies longer latency, and the larger frame segment size (e.g., slice size) implies longer latency. Moreover, the coding block size (e.g., LCU size) and the frame segment size (e.g., slice size) are also factors that may affect the video encoder bitstream bit-rate. For example, the smaller coding block size (e.g., LCU size) implies more bit-rate overhead, and the smaller frame segment size (e.g., slice size) implies more bit-rate overhead. The present invention further proposes using the control circuit (e.g., CPU) 114 of the video transmitting system 100 to adaptively set a coding block size employed by the video encoder 104 and/or a size of each of the frame segments according to a latency requirement of the video encoder 104. In some embodiments of the present invention, the latency requirement of the video encoder 104 may vary for different video source resolutions (e.g., 720×480, 1280× 720, 1920×1088, 3840×2160, etc.) and/or different use cases of the video receiving system 100 (e.g., WiFi display, video recording, etc.). For example, to maintain the video encoder latency within a required range, the coding block size (e.g., LCU size) and/or the frame segment size (e.g., slice size) may be increased when the video resolution (particularly, the vertical size) is switched to a larger value, and the coding block size (e.g., LCU size) and/or the frame segment size (e.g., slice size) may be decreased when the video resolution (particularly, the vertical size) is switched to a smaller value. However, this is for illustrative purposes only, and is not meant to be a limitation of the present invention.

A conventional frame-based video processing design does not start encoding a video frame until pixel data of the video frame is fully received, and does not start outputting a video bitstream of an encoded video frame until encoded pixel data of a video frame is fully generated. Hence, a single video bitstream is generated and transmitted for a single video frame. However, the video decoder performance is usually bounded by entropy decoding performance. As shown in FIG. 2, the present invention proposes partitioning one video frame IMG into multiple frame segments FS_1-FS_N. Hence, each of the NAL streams NAL_1-NAL_N generated from encoding the frame segments FS_1-FS_N can be independently decodable. In one embodiment of the present invention, the video decoder 128 shown in FIG. 1 may be configured to have multiple entropy decoding units for applying entropy decoding to multiple NAL streams in a parallel manner. However, if the NAL streams NAL_1-NAL_N is transmitted sequentially, one entropy decoding unit does not start the entropy operation upon a current NAL stream until a previous NAL stream is completely received by the video receiving system, and another entropy decoding unit does not start the entropy operation upon a next NAL stream until the current NAL stream is completely received by the video receiving system. Thought the video decoder 128 is equipped with multiple entropy decoding units for parallel entropy decoding, the video decoder latency (particularly, the entropy decoding latency) exists due to sequentially transmitted NAL streams NAL_1-NAL_N. The present invention further proposes using in-frame stream interleaving to reduce the video decoder latency (particularly, the entropy decoding latency).

Figure 16:
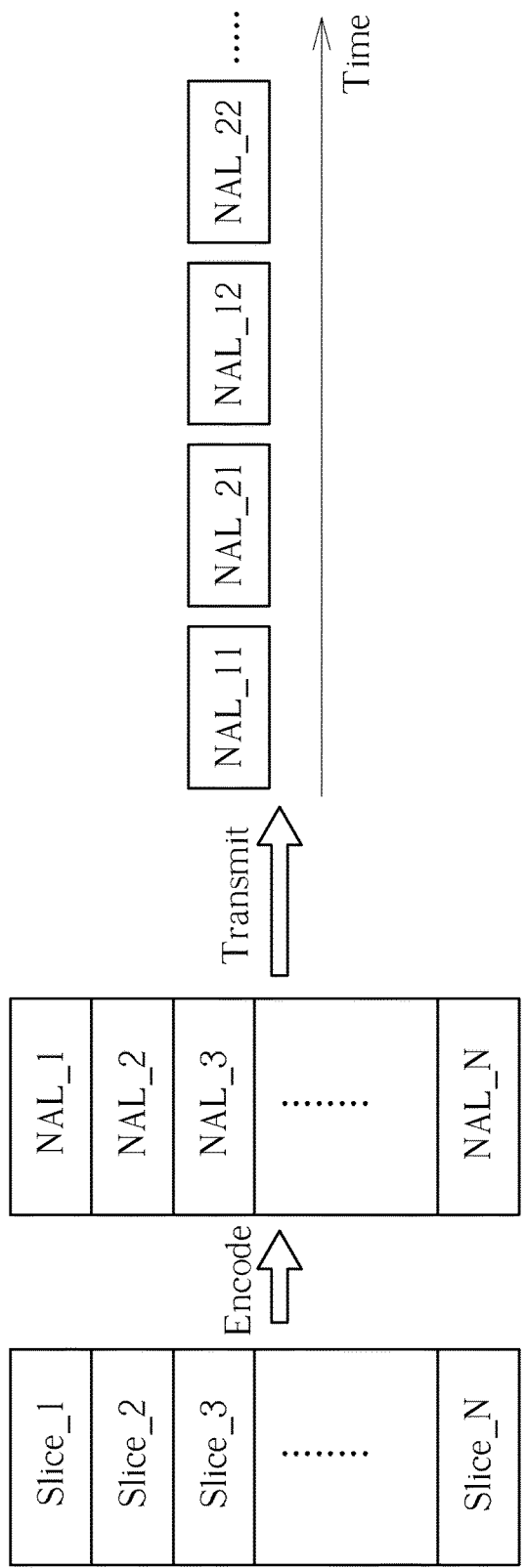
FIG. 16 is a diagram illustrating in-frame stream interleaving according to an embodiment of the present invention.

FIG. 16 is a diagram illustrating in-frame stream interleaving according to an embodiment of the present invention. Suppose that one video frame is partitioned into a plurality of frame segments, such as slices Slice_1-Slice_N. The video encoder 104 encodes the slices Slice_1-Slice_N to generate a plurality of NAL streams NAL_1-NAL_N, respectively. The A/V MUX 110 employs an in-frame stream interleaving scheme to output the NAL streams NAL_1-NAL_N to the TX circuit 112. That is, the A/V MUX 110 interleaves portions of different NAL streams to generate a multiplexing output to the TX circuit 112. Consider a case where the video decoder 128 is configured to have two entropy decoding units. The A/V MUX 110 outputs a first portion NAL_11 of the NAL stream NAL_1, a first portion NAL_21 of the NAL stream NAL_2, a second portion NAL_12 of the NAL stream NAL_1, and a second portion NAL_22 of the NAL stream NAL_2 to the TX circuit 112 successively. Hence, the TX circuit 112 outputs the first portion NAL_11 of the NAL stream NAL_1, the first portion NAL_21 of the NAL stream NAL_2, the second portion NAL_12 of the NAL stream. NAL_1, and the second portion NAL_22 of the NAL stream NAL_2 to the video receiving system 15 successively. A first entropy decoding unit of the video decoder 128 is used to perform entropy decoding upon the NAL stream NAL_1, including the first portion NAL_11 of the NAL stream NAL_1 and the second portion NAL_12 of the NAL stream NAL_1 that are transmitted and received in an in-frame stream interleaving manner. A second entropy decoding unit of the video decoder 128 is used to perform entropy decoding upon the NAL stream NAL_2, including the first portion NAL_21 of the NAL stream NAL_2 and the second portion NAL_22 of the NAL stream NAL_2 that are transmitted and received in an in-frame stream interleaving manner. Since the first portion NAL_11 of the NAL stream NAL_1, the first portion NAL_21 of the NAL stream NAL_2, the second portion NAL_12 of the NAL stream NAL_1, and the second portion NAL_22 of the NAL stream NAL_2 are received by the video receiving system 15 successively, the second entropy decoding unit can start performing entropy decoding upon the first portion NAL_21 of the NAL stream NAL_2 before the NAL stream NAL_1 is completely received by the video receiving system 15. In this way, the video decoder latency (particularly, the entropy decoding latency) can be effectively reduced. It should be noted that the video decoder 128 may be configured to have more than two entropy decoding units, each of the NAL streams NAL_1-NAL_N may be split into more than two portions, and the proposed in-frame stream interleaving scheme can be used to interleave portions of the NAL streams NAL_1-NAL_N to achieve the same objective of reducing the video decoder latency (particularly, the entropy decoding latency).

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video receiving system comprising:
a receiving circuit, arranged to receive NAL streams to be decoded, wherein the NAL streams are generated from encoding pixel data of pixels of a video frame;
a bitstream buffer, arranged to receive the NAL streams from the receiving circuit;
a video decoder, arranged to retrieve an NAL stream of the NAL streams from the bitstream buffer, and start decoding the NAL stream before a last NAL stream of the NAL streams is received by the bitstream buffer;
a display buffer, arranged to receive decoded pixel data of the video frame from the video decoder;
a display circuit, arranged to retrieve decoded pixel data of a portion of the pixels of the video frame from the display buffer, and drive a display device according to the decoded pixel data of the portion of the pixels of the video frame before a decoded pixel data of a last pixel of the video frame is generated from the video decoder, wherein the decoded pixel data of the portion of the pixels of the video frame is generated from decoding the NAL stream;
an audio/video (A/V) demultiplexing circuit, arranged to perform A/V demultiplexing upon a bitstream output of the receiving circuit, wherein the A/V demultiplexing circuit extracts the NAL streams from the bitstream output, and transmits the NAL streams to the bitstream buffer; and
a control circuit, arranged to control an operation of the video receiving system;
wherein the receiving circuit receives a dummy NAL stream following the last NAL stream of the NAL streams, and the dummy NAL stream indicates an end of the video frame; and when the dummy NAL stream is detected by the A/V demultiplexing circuit, the A/V demultiplexing circuit informs the control circuit or the video decoder of the end of the video frame.

2. The video receiving system of claim 1, wherein the video frame is partitioned into a plurality of frame segments; the portion of the pixels of the video frame comprises at least one of the frame segments; and when an NAL stream of said at least one of the frame segments is available in the bitstream buffer, the video decoder is allowed to start decoding the NAL stream of said at least one of the frame segments.

3. The video receiving system of claim 2, wherein each of the frame segments is a slice composed of at least one coding block row.

4. The video receiving system of claim 1, wherein the video frame is partitioned into a plurality of frame segments; the portion of the pixels of the video frame comprises at least one of the frame segments; and when decoded pixel data of said at least one of the frame segments is available in the display buffer, the display circuit is allowed to start driving the display device to display said at least one of the frame segments.

5. The video receiving system of claim 4, wherein each of the frame segments is a slice composed of at least one coding block row.

6. The video receiving system of claim 1, wherein the video frame is partitioned into a plurality of frame segments; the portion of the pixels of the video frame is one of the frame segments; the video encoder decodes the NAL streams to generate decoded pixel data of the frame segments, respectively; the NAL streams comprise a first NAL stream and a second NAL stream; and the receiving circuit receives one portion of the first NAL stream, one portion of the second NAL stream, and another portion of the first NAL stream, successively.

7. A video receiving system comprising:
a receiving circuit, arranged to receive NAL streams to be decoded, wherein the NAL streams are generated from encoding pixel data of pixels of a video frame;
a bitstream buffer, arranged to receive the NAL streams from the receiving circuit;
a video decoder, arranged to retrieve an NAL stream of the NAL streams from the bitstream buffer, and start decoding the NAL stream before a last NAL stream of the NAL streams is received by the bitstream buffer;
a display buffer, arranged to receive decoded pixel data of the video frame from the video decoder;
a display circuit, arranged to retrieve decoded pixel data of a portion of the pixels of the video frame from the display buffer, and drive a display device according to the decoded pixel data of the portion of the pixels of the video frame before a decoded pixel data of a last pixel of the video frame is generated from the video decoder, wherein the decoded pixel data of the portion of the pixels of the video frame is generated from decoding the NAL stream;
an audio/video (A/V) demultiplexing circuit, arranged to perform A/V demultiplexing upon a bitstream output of the receiving circuit, wherein the A/V demultiplexing circuit extracts the NAL streams from the bitstream output, and transmits the NAL streams to the bitstream buffer; and
a control circuit, arranged to control an operation of the video receiving system;
wherein the receiving circuit receives a dummy NAL stream following the last NAL stream of the NAL streams, and the dummy NAL stream indicates an end of the video frame; and when the dummy NAL stream is detected by the control circuit, the control circuit informs the A/V demultiplexing circuit or the video decoder of the end of the video frame.

8. A video receiving system comprising:
a receiving circuit, arranged to receive NAL streams to be decoded, wherein the NAL streams are generated from encoding pixel data of pixels of a video frame;
a bitstream buffer, arranged to receive the NAL streams from the receiving circuit;

a video decoder, arranged to retrieve an NAL stream of the NAL streams from the bitstream buffer, and start decoding the NAL stream before a last NAL stream of the NAL streams is received by the bitstream buffer;

a display buffer, arranged to receive decoded pixel data of the video frame from the video decoder;

a display circuit, arranged to retrieve decoded pixel data of a portion of the pixels of the video frame from the display buffer, and drive a display device according to the decoded pixel data of the portion of the pixels of the video frame before a decoded pixel data of a last pixel of the video frame is generated from the video decoder, wherein the decoded pixel data of the portion of the pixels of the video frame is generated from decoding the NAL stream;

an audio/video (A/V) demultiplexing circuit, arranged to perform A/V demultiplexing upon a bitstream output of the receiving circuit, wherein the A/V demultiplexing circuit extracts the NAL streams from the bitstream output, and transmits the NAL streams to the bitstream buffer; and a control circuit, arranged to control an operation of the video receiving system;

wherein the receiving circuit receives packets carrying the NAL streams generated from encoding the video frame; a last packet of the packets includes a special marker that is set to indicate an end of the video frame; and when the special marker is detected by the A/V demultiplexing circuit, the A/V demultiplexing circuit informs the control circuit or the video decoder of the end of the video frame.

9. A video receiving system comprising:

a receiving circuit, arranged to receive NAL streams to be decoded, wherein the NAL streams are generated from encoding pixel data of pixels of a video frame;

a bitstream buffer, arranged to receive the NAL streams from the receiving circuit;

a video decoder, arranged to retrieve an NAL stream of the NAL streams from the bitstream buffer, and start decoding the NAL stream before a last NAL stream of the NAL streams is received by the bitstream buffer;

a display buffer, arranged to receive decoded pixel data of the video frame from the video decoder;

a display circuit, arranged to retrieve decoded pixel data of a portion of the pixels of the video frame from the display buffer, and drive a display device according to the decoded pixel data of the portion of the pixels of the video frame before a decoded pixel data of a last pixel of the video frame is generated from the video decoder, wherein the decoded pixel data of the portion of the pixels of the video frame is generated from decoding the NAL stream;

an audio/video (A/V) demultiplexing circuit, arranged to perform A/V demultiplexing upon a bitstream output of the receiving circuit, wherein the A/V demultiplexing circuit extracts the NAL streams from the bitstream output, and transmits the NAL streams to the bitstream buffer; and a control circuit, arranged to control an operation of the video receiving system;

wherein the receiving circuit receives packets carrying the NAL streams generated from encoding the video frame; a last packet of the packets includes a special marker that is set to indicate an end of the video frame; and when the special marker is detected by the control circuit, the control circuit informs the A/V demultiplexing circuit or the video decoder of the end of the video frame.

* * * * *